United States Patent
Sharief

(10) Patent No.: US 8,467,311 B2
(45) Date of Patent: Jun. 18, 2013

(54) METHOD AND SYSTEM FOR AVOIDING FLOODING OF PACKETS IN SWITCHES

(75) Inventor: Ihsan Ulla Sharief, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/077,093

(22) Filed: Mar. 31, 2011

(65) Prior Publication Data

US 2012/0250683 A1    Oct. 4, 2012

(51) Int. Cl.
*G01R 31/08* (2006.01)
(52) U.S. Cl.
USPC .............................. 370/252; 370/254; 370/255
(58) Field of Classification Search
None
See application file for complete search history.

(56) References Cited

U.S. PATENT DOCUMENTS

| | | | |
|---|---|---|---|
| 7,925,722 B1 * | 4/2011 | Reed et al. | 709/220 |
| 7,937,471 B2 * | 5/2011 | Alkhatib et al. | 709/226 |
| 8,259,596 B1 * | 9/2012 | Oak | 370/252 |
| 8,284,785 B2 * | 10/2012 | Hirata | 370/400 |
| 2009/0245242 A1 * | 10/2009 | Carlson et al. | 370/386 |
| 2012/0096184 A1 * | 4/2012 | Lambert et al. | 709/245 |
| 2012/0250683 A1 * | 10/2012 | Sharief | 370/390 |

* cited by examiner

*Primary Examiner* — Robert Wilson
(74) *Attorney, Agent, or Firm* — Thomas Horstemeyer, LLP

(57) ABSTRACT

Certain aspects of a method and system for avoiding flooding of packets in switches may include a network comprising a plurality of switches interconnected to one or more hosts. One of the plurality of switches may communicate a discovery request to the one or more hosts to determine a MAC address of the one or more hosts. One of the plurality of switches may receive a discovery response from the one or more hosts in response to the communicated discovery request. One of the plurality of switches may update their L2 databases with the MAC addresses of the one or more hosts based on the received discovery response. If the MAC address of a destination host is listed in the L2 database, a switch may communicate a received packet to the destination host using one or more other switches based on the MAC address in the L2 database.

21 Claims, 6 Drawing Sheets

METHOD AND SYSTEM FOR AVOIDING FLOODING OF PACKETS IN SWITCHES

CROSS-REFERENCE TO RELATED APPLICATIONS/INCORPORATION BY REFERENCE

None.

FIELD OF THE INVENTION

Certain embodiments of the invention relate to networking systems. More specifically, certain embodiments of the invention relate to a method and system for avoiding flooding of packets in switches.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) and 10-Gbps and higher, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is being utilized. TCP/IP chimney offload maximizes utilization of host CPU resources for application workloads, for example, on Gigabit and multi-Gigabit networks.

Converged network interface devices are generally utilized to integrate a plurality of different types of network traffic into one physical network. This may, however, cause issues with quality of service (QoS) requirements for the different types of traffic. Management traffic, for example, may require guaranteed delivery regardless of traffic conditions. Converged network interface devices may be utilized to perform protocol acceleration and protocol processing beyond OSI layer 2 and may require considerable computational power. Certain types of traffic such as clustering traffic may require low latency. Storage traffic, for example, may require efficient guaranteed delivery with varying bursty traffic loads. Some types of traffic such as critical networking traffic may require varying levels of prioritization, while other networking traffic may require best effort.

Clustering traffic may use proprietary or standardized clustering technologies. Storage traffic may use fibre channel, for example, while networking traffic may use Ethernet. In many cases, management traffic may utilize a separate out of band management network to guarantee delivery and avoid mixing it with the user Ethernet network. Each of these separate networks may be specifically designed to guarantee the quality of service required for the payload it carries so that there are no other traffic types with conflicting QoS requirements trying to share the same network. When consolidating all these networks over a single network that carries all traffic types, the converged network may provide similar QoS as guaranteed by the physically separate networks.

Computer networks comprise a plurality of interconnected networking devices, such as routers, switches and/or computers. The physical connection that allows one networking device to communicate with another networking, device is referred to as a link. Links may utilize wired or wireless communication technologies. Data may be communicated between networking devices via the link in groups of binary bits referred to as packets. The rate at which networking devices may communicate data via a link is referred to as link speed.

Demands for increasing link speeds and computing speeds have driven a variety of specialized computer networking architectures. There are networking architectures, such as Ethernet, which are widely utilized for communications based on the Internet Protocol (IP). There are other networking architectures, such as Fibre Channel, which are widely utilized in storage area network (SAN) architectures. Still other networking architectures are utilized in cluster computing architectures.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for avoiding flooding of packets in switches, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for avoiding flooding of packets in switches. Exemplary aspects of the invention may comprise a network comprising a plurality of switches interconnected to one or more hosts. One of the plurality of switches may be operable to communicate a discovery request to the one or more hosts to determine a MAC address of the one or more hosts. A discovery response may be received, by one of the plurality of switches, from the one or more hosts in response to the communicated discovery request. The one of the plurality of switches may be operable to update an L2 database with the MAC addresses of the one or more hosts based on the received discovery response.

A first of the plurality of switches may be operable to receive, from the one or more hosts, a packet to be communicated to another of the one or more hosts. The first of the plurality of switches may be operable to determine whether the MAC address of another of the one or more hosts is listed in the L2 database. In instances where the MAC address of another of the one or more hosts is not listed in the L2 database, the received packet may be replicated to remaining ones of the plurality of switches other than the first of the plurality of switches. A database update request may be communicated from the first of the plurality of switches to the remaining ones of the plurality of switches to determine the MAC address of another of the one or more hosts. A host discovery table may be updated based on the communicated database update request. The remaining ones of the plurality of switches may be operable to determine whether another of the one or more hosts is directly connected to any of the remaining ones of the plurality of switches based on the communicated database update request. A database update response may be received from any of the remaining ones of the plurality of switches that is directly connected to another of the one or more hosts. The L2 database may be updated with the MAC address corresponding to a port on which the database update response is received. An entry in the host discovery table may be deleted based on the received database update response.

Figure 1:
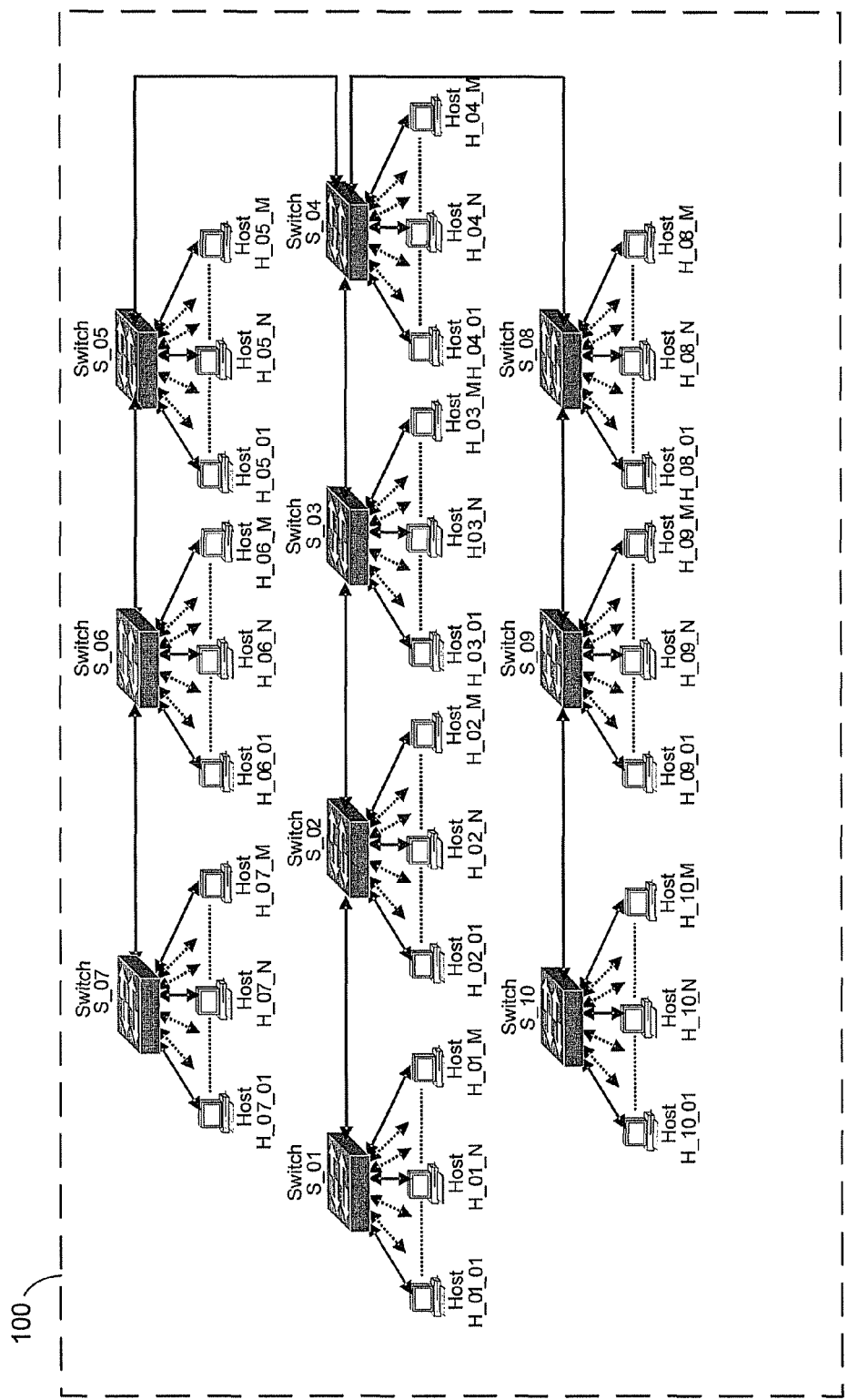
FIG. 1 is a block diagram of an exemplary network comprising one or more switches interconnected to one or more hosts that may be utilized in connection with an embodiment of the invention.

FIG. 1 is a block diagram of an exemplary network comprising one or more switches interconnected to one or more hosts that may be utilized in connection with an embodiment of the invention. Referring to FIG. 1, there is shown a network 100. The network 100 may comprise a plurality of switches S_01, S_02, ..., S_10, for example. Each of the plurality of switches S_01, S_02, ..., S_10 may be interconnected to a plurality of hosts. For example, the switch S_01 may be interconnected to a plurality of hosts, H_01_01 ... H_01_N ... H_01_M, for example. Similarly, the switch S_02 may be interconnected to a plurality of hosts, H_02_01 ... H_02_N ... H_02_M, for example, the switch S_03 may be interconnected to a plurality of hosts, H_03_01 ... H_03_N ... H_03_M, for example, the switch S_04 may be interconnected to a plurality of hosts, H_04_01 ... H_04_N ... H_04_M, for example, the switch S_05 may be interconnected to a plurality of hosts, H_05_01 ... H_05_N ... H_05_M, for example, the switch S_06 may be interconnected to a plurality of hosts, H_06_01 ... H_06_N ... H_06_M, for example, the switch S_07 may be interconnected to a plurality of hosts, H_07_01 H_07_N ... H_07_M, for example, the switch S_08 may be interconnected to a plurality of hosts, H_08_01 ... H_08_N ... H_08_M, for example, the switch S_09 may be interconnected to a plurality of hosts, H_09_01 ... H_09_N ... H_09_M, for example, and the switch S_10 may be interconnected to a plurality of hosts, H_10_01 ... H_10_N ... H_10_M, for example.

The plurality of switches S_01, S_02, ..., S_10, for example, may comprise suitable logic, circuitry, interfaces, and/or code that may be operable to perform level 2 (L2) switching operations, for example, switching between a plurality of hosts and a server. The plurality of hosts H_01_01 ... H_01_N ... H_01_M, for example, may comprise suitable logic, circuitry, interfaces, and/or code that may be operable to offer information resources, services, and/or applications to users or other network nodes on the network 100.

Figure 2:
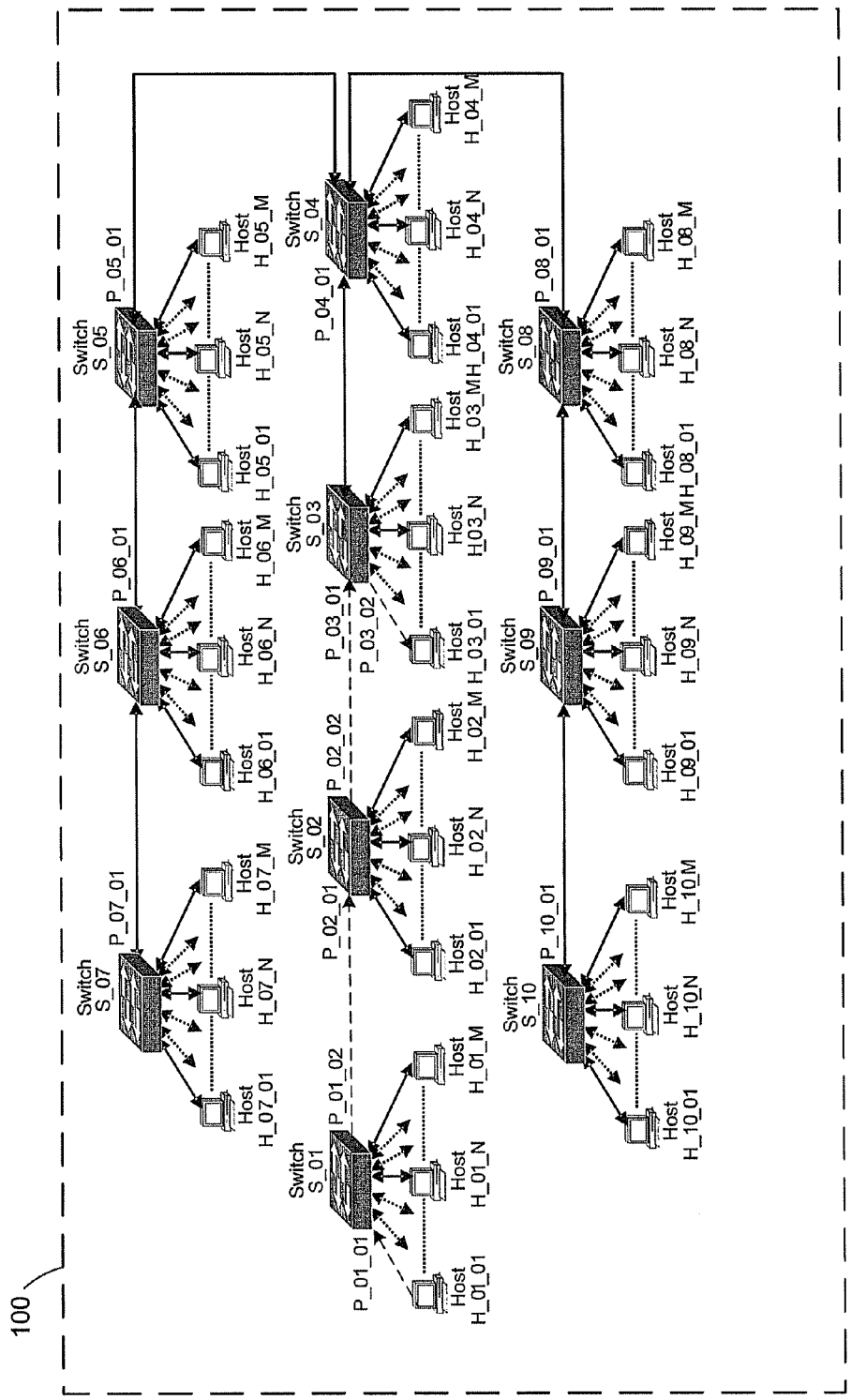
FIG. 2 is a block diagram of an exemplary network comprising one or more switches interconnected to one or more hosts that may be utilized to avoid flooding of packets in switches, in accordance with an embodiment of the invention.

FIG. 2 is a block diagram of an exemplary network comprising one or more switches interconnected to one or more hosts to avoid flooding of packets in switches, in accordance with an embodiment of the invention. Referring to FIG. 2, there is shown the network 100. The network 100 may comprise a plurality of switches S_01, S_02, ..., S_10, for example. Each of the plurality of switches S_01, S_02, ..., S_10 may be interconnected to a plurality of hosts. For example, the switch S_01 may be interconnected to a plurality of hosts, H_01_01 ... H_01_N ... H_01_M, for example. Each of the plurality of switches S_01, S_02 ..., S_10 may comprise a plurality of ports. For example, the switch S_01 may comprise an ingress port P_01_01 and an egress port P_01_02, for example.

The plurality of switches S_01, S_02, ... S_10, for example, may comprise suitable logic, circuitry, interfaces, and/or code that may be operable to perform level 2 (L2) switching operations, for example, switching between a plurality of hosts and a server. The plurality of switches S_01, S_02, ... S_10, for example, may be operable to communicate data via one or more ports, for example.

The plurality of hosts H_01_01 ... H_01_N ... H_01_M, for example, may comprise suitable logic, circuitry, interfaces, and/or code that may be operable to offer information resources, services, and/or applications to users or other network nodes on the network 100. In an exemplary embodiment, the plurality of hosts H_01_01 ... H_01_N ... H_01_M, for example, may be virtual local area network (VLAN) nodes and may be assigned a network layer host address. In an exemplary embodiment, the plurality of hosts H_01_01 ... H_01_N ... H_01_M, for example, may be virtual local area network (VLAN) nodes and may be assigned a network layer host address.

In accordance with another embodiment of the invention, the network 100 may be free of loops based on a spanning tree protocol that may ensure a loop free topology for the network 100.

In operation, when a source host, for example, the host H_01_01 intends to communicate packets to a destination host, for example, the host H_03_01, the host H_01_01 may communicate the packets through the plurality of switches S_01, S_02, and S_03, for example. In one instance, initially, none of the plurality of switches S_01, S_02, ..., S_10, for example, in the network 100, may have information regarding any of the plurality of hosts in their corresponding databases.

A packet may ingress on port P_01_01 on switch S_01, and the switch S_01 may learn that the MAC address of H_01_01 is present on port P_01_01. Switch S_01 may not have information regarding the port number through which the received packet may be forwarded to reach the destination host H_03_01. Accordingly, the received packet may be flooded or replicated by switch S_01 to all the interconnected plurality of hosts H_01_02 ... H_01_N ... H_01_M, for example, except to the port P_01_01 on which the packet was received. When the replicated packet reaches the plurality of hosts H_01_02 ... H_01_N ... H_01_M, for example, connected to the switch S_01, the plurality of hosts H_01_02 ... H_01_N ... H_01_M, for example, may be operable to discard the packet as their MAC address does not correspond to the MAC address of the destination host H_03_01.

Furthermore, the switch S_01 may be operable to replicate and communicate the packet to switch S_02 through port P_02_01. When the packet reaches switch S_02 through port P_02_01, one or more of the above steps may be repeated. For example, the switch S_02 may be operable to learn that the MAC address of the source host H_01_01 is present on port P_02_01. The switch S_02 may be operable to flood or replicate and communicate the received packets to all its interconnected plurality of hosts H_02_01 ... H_02_N ... H_02_M, for example. The plurality of hosts H_02_01 ... H_02_N ... H_02_M, for example, may be operable to drop or discard the received packets because their MAC address does not correspond to the MAC address of the destination host H_03_01.

Furthermore, the switch S_02 may be operable to replicate and communicate the packet to the switch S_03 through port P_03_01. When the packet reaches switch S_03 through port P_03_01, one or more of the above steps may be repeated. For example, the switch S_03 may be operable to learn that the MAC address of the source host H_01_01 is present on port P_03_01. The switch S_03 may be operable to flood or replicate and communicate the received packets to all its interconnected plurality of hosts H_03_01 ... H_03_N ... H_03_M, for example. The plurality of hosts H_03_02 ... H_03_N ... H_03_M, for example, may be operable to drop or discard the received packets because their MAC address does not correspond to the MAC address of the destination host H_03_01. The destination host H_03_01 may receive the packet because of a matching MAC address.

Furthermore, since the switch S_03 may flood the received packet to all its ports, the packet may be communicated through the plurality of switches S_04, S_05, S_06, S_07, S_08, S_09, S_10, for example, and each of the plurality of switches S_04, S_05, S_06, S_07, S_08, S_09, S_10, for example, may perform one or more of the above steps. For example, each of the plurality of switches S_04, S_05, S_06, S_07, S_08, S_09, S_10, for example, may be operable to learn that the MAC address of source host H_01_01 is present on port P_04_01, P_05_01, P_06_01, P_07_01, P_08_01, P_09_01, and P_10_01 respectively. Each of the plurality of switches S_04, S_05, S_06, S_07, S_08, S_09, S_10, for example, may be operable to flood or replicate and communicate the received packets to all the corresponding interconnected plurality of hosts H_04_01 ... H_04_N ... H_04_M, for example. The plurality of hosts H_04_01 ... H_04_N ... H_04_M, for example, may be operable to drop or discard the received packets because their MAC addresses do not correspond to the MAC address of the destination host H_03_01.

TABLE 1

| Switch S_01 | | Switch S_02 | | Switch S_03 | | Switch S_04 | | Switch S_05 | |
|---|---|---|---|---|---|---|---|---|---|
| MAC Add | Port | MAC Add | Port | MAC Add | Port | MAC Add | Port | MAC Add | Port |
| H_01_01 | P_01_01 | H_01_01 | P_02_01 | H_01_01 | P_03_01 | H_01_01 | P_04_01 | H_01_01 | P_05_01 |

| Switch S_06 | | Switch S_07 | | Switch S_08 | | Switch S_09 | | Switch S_10 | |
|---|---|---|---|---|---|---|---|---|---|
| MAC Add | Port | MAC Add | Port | MAC Add | Port | MAC Add | Port | MAC Add | Port |
| H_01_01 | P_06_01 | H_01_01 | P_07_01 | H_01_01 | P_08_01 | H_01_01 | P_09_01 | H_01_01 | P_10_01 |

Table 1 illustrates entries in an exemplary database of each of the plurality of switches S_01, S_02, ..., S_10, for example, after a packet has been communicated through the network 100.

In accordance with an embodiment of the invention, the plurality of switches S_01, S_02, ..., S_10, for example, may have learnt the MAC address of the source host H_01_01. The plurality of switches S_01, S_02, ..., S_10, for example, may be aware where to forward another packet when the packet is to be communicated to the host H_01_01. This information may be useful when another host is attempting to forward packets to the host H_01_01. For the current flow of packets, from the host H_01_01 to the host H_03_01, the plurality of switches S_01, S_02, ..., S_10, for example, may be flooding the packets in the entire network 100.

In accordance with another exemplary embodiment of the invention, the host H_01_01 may be operable to communicate a control packet at a higher level that may indicate to the host H_03_01 that the host H_01_01 may start communicating packets to the host H_03_01. Once the host H_03_01 receives this control packet, the host H_03_01 may be operable to respond back to the host H_01_01. When this response packet passes through the network 100, the plurality of switches S_01, S_02, and S_03 in the network 100 may be operable to update the MAC address of the host H_03_01 in their corresponding databases. The host H_01_01 may be operable to start communicating the packets to the host H_03_01 based on receiving the response packet from the host H_03_01.

TABLE 2

| Switch S_01 | | Switch S_02 | | Switch S_03 | | Switch S_04 | | Switch S_05 | |
|---|---|---|---|---|---|---|---|---|---|
| MAC Add | Port | MAC Add | Port | MAC Add | Port | MAC Add | Port | MAC Add | Port |
| H_01_01 | P_01_01 | H_01_01 | P_02_01 | H_01_01 | P_03_01 | H_01_01 | P_04_01 | H_01_01 | P_05_01 |
| H_03_01 | P_01_02 | H_03_01 | P_02_02 | H_03_01 | P_03_02 | | | | |

| Switch S_06 | | Switch S_07 | | Switch S_08 | | Switch S_09 | | Switch S_10 | |
|---|---|---|---|---|---|---|---|---|---|
| MAC Add | Port | MAC Add | Port | MAC Add | Port | MAC Add | Port | MAC Add | Port |
| H_01_01 | P_06_01 | H_01_01 | P_07_01 | H_01_01 | P_08_01 | H_01_01 | P_09_01 | H_01_01 | P_10_01 |

Table 2 illustrates entries in an exemplary database of each of the plurality of switches S_01, S_02, . . . , S_10, for example, after a response packet has been received by the host H_01_01.

Figure 3:
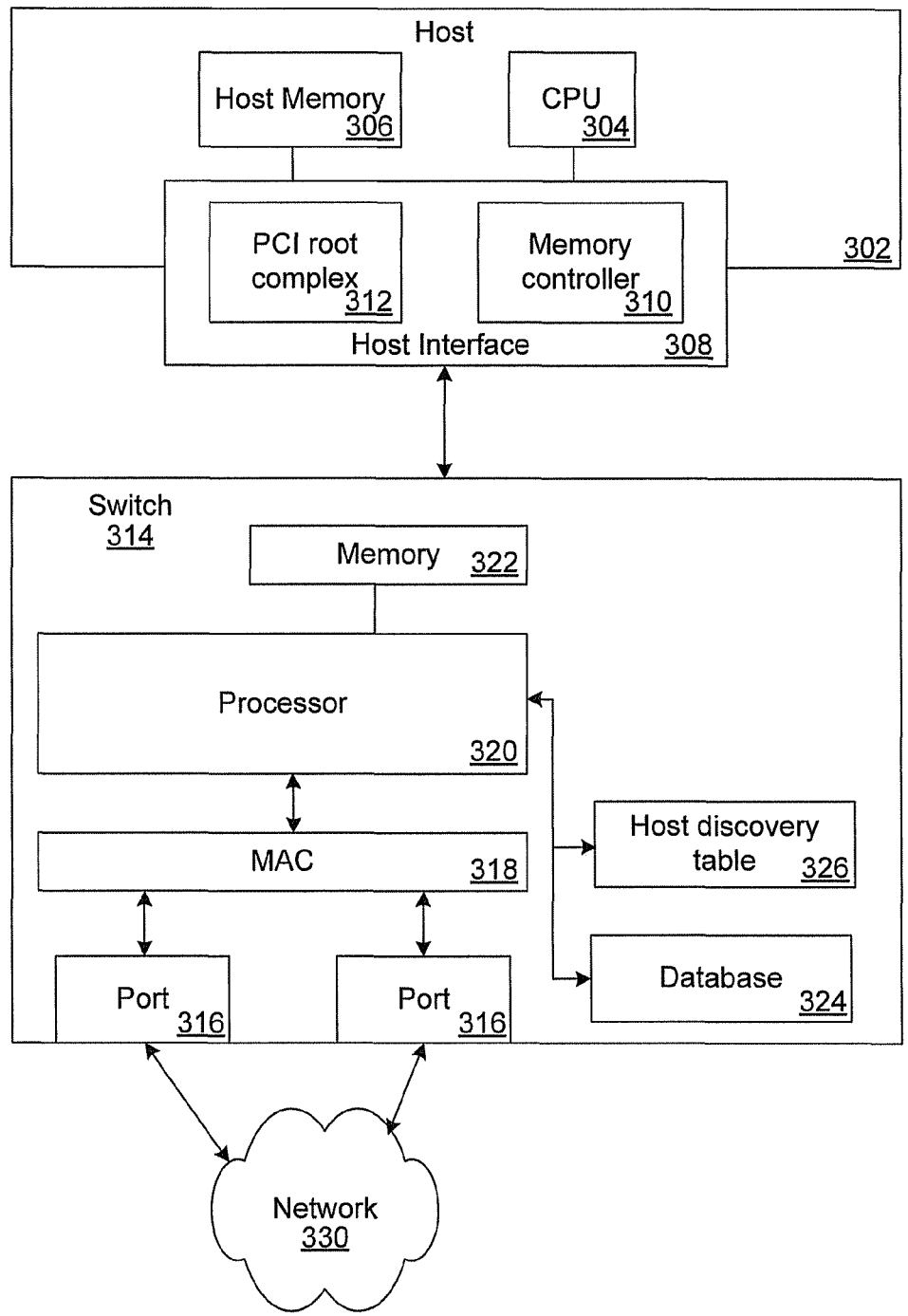
FIG. 3 is a block diagram of an exemplary host coupled to an exemplary switch for avoiding flooding of packets, in accordance with an embodiment of the invention.

FIG. 3 is a block diagram of an exemplary host coupled to an exemplary switch for avoiding flooding of packets, in accordance with an embodiment of the invention. Referring to FIG. 3, there is shown a host 302, and a switch 314 coupled to a network 330.

The host 302 may be substantially similar to the plurality of hosts H_01_01 H_01_N . . . H_01_M, for example, as described with respect to FIG. 2. The host 302 may comprise a CPU 304, a host memory 306, and a host interface 308. The host interface 308 may comprise a memory controller 310 and a peripheral component interconnect (PCI) root complex 312.

The host interface 308 may be, for example, PCI, PCI-X, PCI-Express, ISA, SCSI or other type of bus. The host interface 308 may be coupled to PCI buses and/or devices, one or more processors, CPU 304 and memory, for example, host memory 306. Notwithstanding, the host memory 306 may be directly coupled to the switch 314. The PCI root complex 312 may enable the host 302 to be coupled to PCI buses and/or devices, one or more processors, and memory, for example, host memory 306.

The memory controller 310 may be coupled to the CPU 304, to the host memory 306 and to the host interface 308. The memory controller 310 may comprise suitable logic, interfaces, code, and/or one or more circuits that may be operable to transfer data from a storage device or a LAN interface controller directly to random access memory (RAM), which may speed up processing of data.

The CPU 304 may comprise suitable logic, interfaces, code, and/or one or more processors that may be operable to offer information resources, services, and/or applications to users or other nodes on the network 330. Although illustrated, for example, as a CPU 304 and a network 330, the present invention need not be so limited to such examples and may employ, for example, any type of processor and any type of data link layer or physical media, respectively. The network 330 may be operable to carry Ethernet packet traffic, for example. In another embodiment of the invention, the CPU 304 may be operable to handle a plurality of networking protocols and may be directly coupled to the network 330. Furthermore, the present invention also contemplates different degrees of integration and separation between the components illustrated in FIG. 3.

The switch 314 may comprise suitable logic, circuitry, interfaces, and/or code that may be operable to perform Ethernet switching operations, for example, switching between a plurality of clients or hosts. The switch 314 may enable level 2 (L2) switching operations, for example. The switch 314 may be coupled to the host 302 via the PCI root complex 312. The switch 314 may comprise one or more Ethernet ports 316, a MAC 318, a processor 320, a memory 322, a database 324, and a host discovery table 326. For example, the processor 320 may be a separate integrated chip embedded on a motherboard or may be embedded in a NIC.

Each of the plurality of Ethernet ports 316 may comprise suitable circuitry and/or interfaces that may be operable to receive and/or communicate packets via the network 330. The plurality of Ethernet ports 316 may provide the hardware for sending and receiving data on a carrier, for example, cables. The MAC 318 may comprise suitable logic, circuitry, interfaces, and/or code that may be operable to control access to a medium that may be shared between a plurality of entities. The MAC 318 may comprise a MAC address that is unique to each switch 314. The MAC 318 may be operable to encode and/or decode data packets into bits. The MAC 318 may be operable to furnish transmission protocol knowledge and/or management and may handle errors in the physical layer, flow control and frame synchronization. The MAC 318 may be operable to control how a computer on the network gains access to the data and permission to transmit it.

The processor 320 may comprise suitable logic, interfaces, and/or one or more circuits that may be operable to determine the connection identifier and/or a packet type for each packet. For example, the processor 320 may be operable to communicate one or more Ethernet packets to the CPU 304 based on the Ethertype of the received packets. The processor 320 may enable a converged fabric for networking, storage, and clustering.

The memory 322 may comprise suitable logic, interfaces, code, and/or one or more circuits that may be operable to employ a buffering scheme to store network, packets until they are communicated via the Ethernet ports 316. In accordance with an embodiment of the invention, one or more of the Ethernet ports 316 may have a memory to buffer incoming and/or outgoing packets. Notwithstanding, the invention may not be so limited and other memory buffers may be utilized without limiting the scope of the invention.

The database 324 may comprise suitable logic, circuitry, interfaces, and/or code that may be operable to store a plurality of L2 MAC addresses for each of a plurality of hosts. For example, the database 324 in the switch S_01 may be operable to store a plurality of L2 MAC addresses for each of the plurality of hosts, H_01_01 . . . H_01_N . . . H_01_M, for example.

The host discovery table 326 may comprise suitable logic, circuitry, interfaces, and/or code that may be operable to store entries corresponding to the destination address in a received packet that may indicate that the particular switch has already communicated a database update request for the corresponding destination address so that a new database update request is not sent out for the same destination address. The host discovery table 326 may be operable to ensure that the database update requests are not communicated frequently, which may cause flooding of the network 330. The corresponding entry in the host discovery table 326 may be deleted when the switch 314 receives a database update response for the corresponding destination address and/or after a particular duration of time.

Figure 4A:
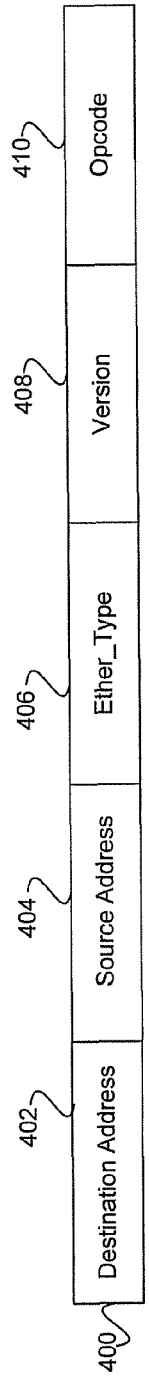
FIG. 4A is an exemplary frame format of an exemplary discovery request, in accordance with an embodiment of the invention.

FIG. 4A is an exemplary frame format of an exemplary discovery request, in accordance with an embodiment of the invention. Referring to FIG. 4A, there is shown an exemplary discovery request 400.

The discovery request 400 may be utilized by the plurality of switches S_01, S_02, . . . , S_10, for example, to discover directly connected hosts. The discovery request 400 may have a plurality of fields, for example, a destination address field 402, a source address field 404, an Ether_Type field 406, a version field 408, and an Opcode field 410.

The destination address field 402 may comprise a multicast address MC_DA_1, for example, corresponding to a destination address of a packet. In accordance with an embodiment, one of the reserved multicast MAC addresses may be used for the destination address field 402. The source address field 404 may comprise the MAC address S_MAC_1, for example, of the switch S_01 that is attempting to discover directly connected hosts. The Ether_Type field 406 may comprise a new ethertype that may be reserved for this protocol. The version field 408 may comprise a version of the protocol and may provide provision for enhancing the existing protocol, if necessary. The Opcode field 410 may comprise a value indicating that the packet is a host discovery packet from a switch S_01 to the host H_03_01.

Figure 4B:
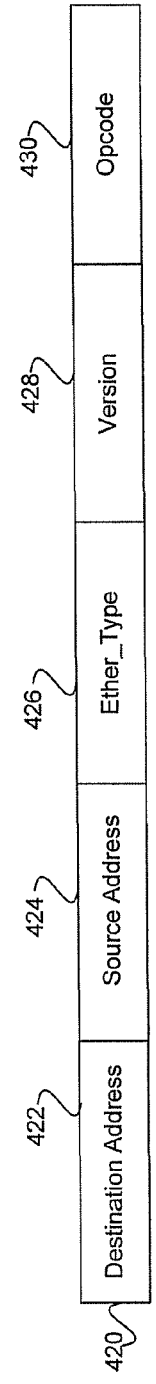
FIG. 4B is an exemplary frame format of an exemplary discovery response, in accordance with an embodiment of the invention.

FIG. 4B is an exemplary frame format of an exemplary discovery response, in accordance with an embodiment of the invention. Referring to FIG. 4B, there is shown an exemplary discovery response 420.

The discovery response 420 may be utilized by the plurality of hosts to respond to host discovery requests received from the plurality of switches S_01, S_02, . . . , S_10, for example. The discovery response 420 may have a plurality of fields, for example, a destination address field 402, a source address field 404, an Ether_Type field 406, a version field 408, and an Opcode field 410.

The destination address field 422 may comprise the MAC address S_MAC_1, for example, of the switch S_01 that had sent the host discovery packet. The source address field 424 may comprise the MAC address MAC_SA_1, for example, of the host H_03_01 that is responding to the discovery request 400. The Ether_Type field 426 may comprise a new ethertype that may be reserved for this protocol and may be similar to the Ether_Type field 406. The version field 428 may comprise a version of the protocol and may provide provision for enhancing the existing protocol, if necessary, and may be similar to the version field 408. The Opcode field 430 may comprise a value indicating that the packet is a response to the host discovery packet that was received from a switch S_01.

Figure 4C:
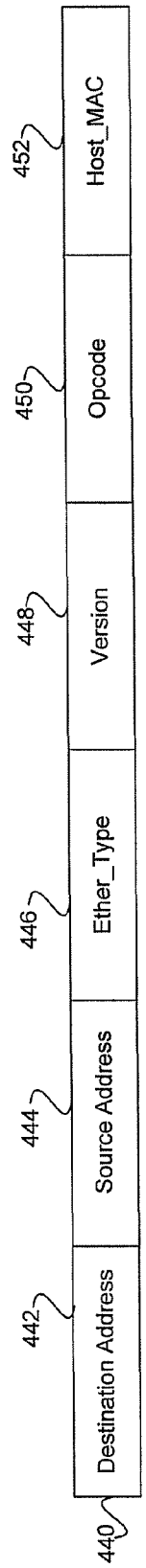
FIG. 4C is an exemplary frame format of an exemplary database update request, in accordance with an embodiment of the invention.

FIG. 4C is an exemplary frame format of an exemplary database update request, in accordance with an embodiment of the invention. Referring to FIG. 4C, there is shown an exemplary database update request 440.

The database update request 440 may be utilized by the plurality of switches S_01, S_02, . . . , S_10, for example, to discover one or more hosts and update their databases 324. The database update request 440 may have a plurality of fields, for example, a destination address field 442, a source address field 444, an Ether_Type field 446, a version field 448, an Opcode field 450, and a Host_MAC field 452.

The destination address field 442 may comprise a multicast address MC_DA_1, for example, corresponding to a destination address of a packet. In accordance with an embodiment, one of the reserved multicast MAC addresses may be used for the destination address field 442. The source address field 444 may comprise the MAC address S_MAC_1, for example, of the switch S_01 that is attempting to discover one or more hosts H_03_01. The Ether_Type field 446 may comprise a new ethertype that may be reserved for this protocol, and may be similar to the Ether_Type field 406. The version field 448 may comprise a version of the protocol and may provide provision for enhancing the existing protocol, if necessary. The Opcode field 450 may comprise a value indicating that the packet is a L2 database update request packet from a switch to one or more other switches connected to it. The Host_MAC field 452 may comprise a value, for example, H_1 indicating the MAC address of the host H_03_01 that the switch S_01 is attempting to discover.

Figure 4D:
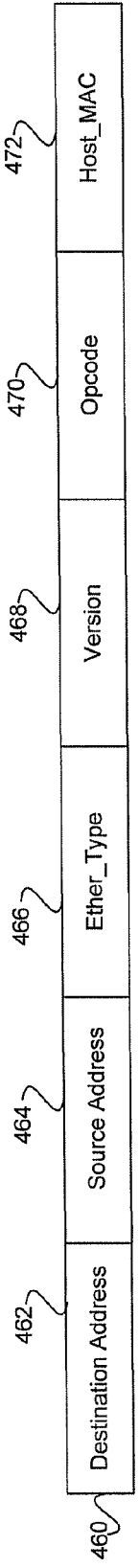
FIG. 4D is an exemplary frame format of an exemplary database update response, in accordance with an embodiment of the invention.

FIG. 4D is an exemplary frame format of an exemplary database update response, in accordance with an embodiment of the invention. Referring to FIG. 4D, there is shown an exemplary database update response 460.

The database update response 460 may be utilized by the plurality of switches S_01, S_02, . . . , S_10, for example to respond to database update requests 440 received from the plurality of switches S_01, S_02, . . . , S_10, for example. The database update response 460 may have a plurality of fields, for example, a destination address field 462, a source address field 464, an Ether_Type field 466, a version field 468, an Opcode field 470, and a Host_MAC field 472.

The destination address field 462 may comprise the MAC address S_MAC_1, for example, of the switch S_01 that had sent the database update request 440. The source address field 464 may comprise the MAC address S_MAC_2, for example, of the switch S_03 that is responding to the database update request 460. The Ether_Type field 466 may comprise a new ethertype that may be reserved for this protocol and may be similar to the Ether_Type field 406. The version field 468 may comprise a version of the protocol and may provide provision for enhancing the existing protocol, if necessary, and may be similar to the version field 468. The Opcode field 470 may comprise a value indicating that the packet is a database update response 460 to the database update request 440 that was received from a switch S_01. The Host_MAC field 472 may comprise a value, for example, H_1 indicating the MAC address of the host H_03_01 that the switch S_01 is attempting to discover.

Figure 5:
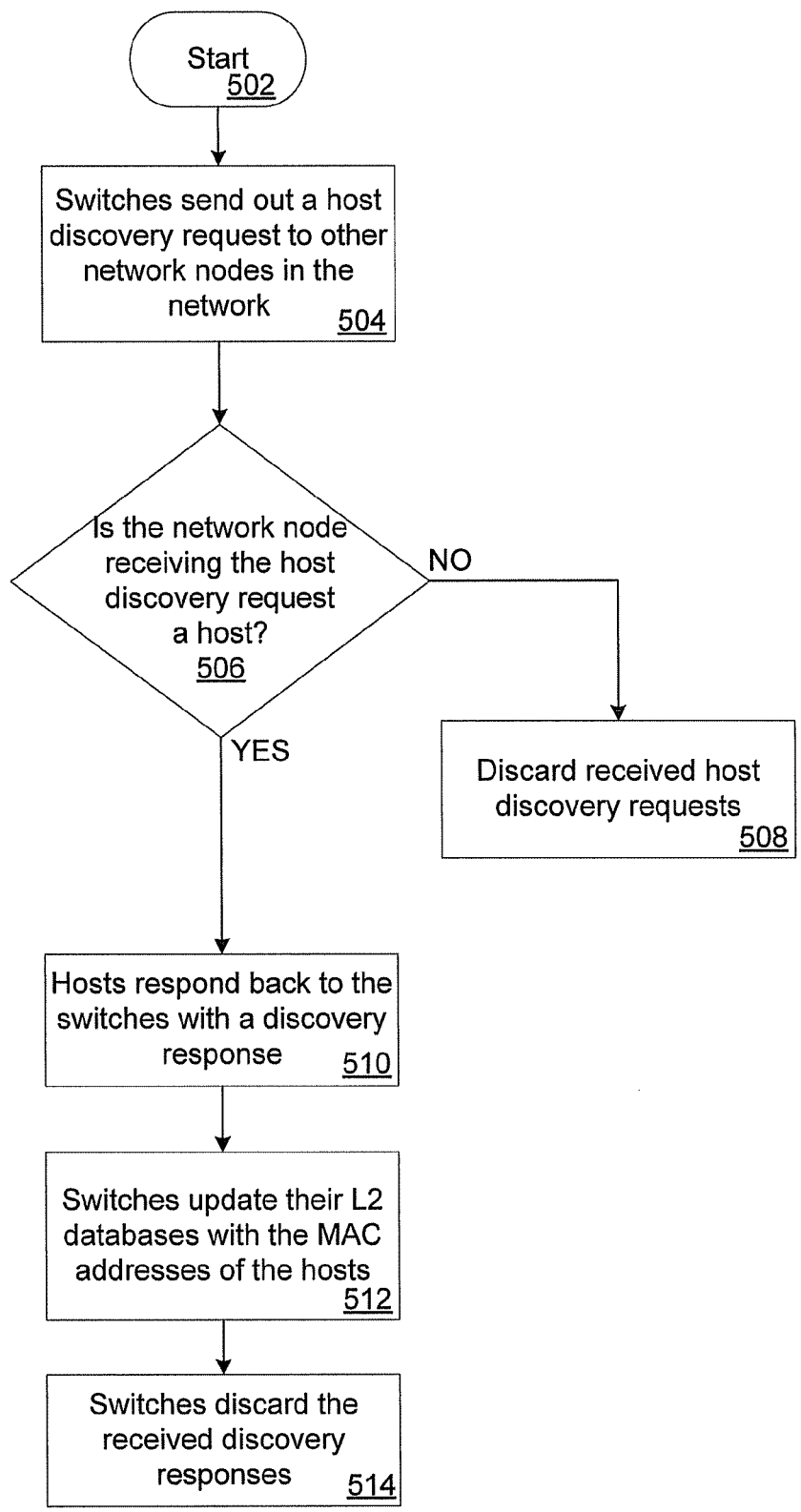
FIG. 5 is an exemplary flow chart illustrating exemplary steps for discovery of directly connected hosts, in accordance with an embodiment of the invention.

FIG. 5 is an exemplary flow chart illustrating exemplary steps for discovery of directly connected hosts, in accordance with an embodiment of the invention. Referring to FIG. 5, exemplary steps may begin at step 502.

In step 504, one or more of the plurality of switches S_01, S_02, . . . , S_10, for example, may be operable to communicate host discovery requests 400 as described with respect to FIG. 4A, for example, to one or more network nodes, for example, the plurality of switches S_01, S_02, . . . , S_10, for example, and/or the plurality of corresponding hosts H_01_02 . . . H_01_N . . . H_01_M, H_01_02 . . . H_01_N . . . H_01_M, for example. In accordance with an embodiment of the invention, one or more of the plurality of switches S_01, S_02, . . . , S_10, for example, may be operable to communicate the host discovery requests 400 when one or more switches are activated and/or when there is a change in the topology of the network 100.

In step 506, it may be determined whether one or more of the network nodes that are receiving the host discovery requests 400 are one or more of the plurality of hosts H_01_02 ... H_01_N ... H_01_M, H_01_02 ... H_01_N ... H_01_M, for example. In instances where one or more of the network nodes that are receiving the host discovery requests 400 are not one or more of the plurality of hosts H_01_02 ... H_01_N ... H_01_M, H_01_02 ... H_01_N ... H_01_M, for example, control passes to step 508, where the received host discovery requests 400 may be discarded. For example, in step 508, one or more of the plurality of switches S_01, S_02, ..., S_10, for example, that receive the host discovery requests 400 from one or more other switches may be operable to discard the received host discovery requests 400.

In instances where one or more of the network nodes that are receiving the host discovery requests 400 are one or more of the plurality of hosts H_01_02 ... H_01_N ... H_01_M, H_01_02 ... H_01_N ... H_01_M, for example, control passes to step 510. In step 510, one or more of the plurality of hosts H_01_02 ... H_01_N ... H_01_M, H_01_02 ... H_01_N ... H_01_M, for example, may be operable to respond back to the one or more of the plurality of switches S_01, S_02, ..., S_10, for example, with host discovery responses 420 as described with respect to FIG. 4B based on the reception of the host discovery requests 400.

In step 512, one or more of the plurality of switches S_01, S_02, ..., S_10, for example, may be operable to receive the host discovery responses 420 from one or more of the plurality of hosts H_01_02 ... H_01_N ... H_01_M, H_01_02 ... H_01_N ... H_01_M, for example, and update its corresponding L2 database, for example, database 324 with the MAC address of the corresponding one or more of the plurality of hosts H_01_02 ... H_01_N ... H_01_M, H_01_02 ... H_01_N ... H_01_M, for example. In step 514, one or more of the plurality of switches S_01, S_02 ..., S_10, for example, may be operable to discard the received host discovery responses 420. In an exemplary embodiment, the entries in the updated database 324 may be marked as directly connected hosts in order to prevent aging out of the corresponding entries.

Figure 6:
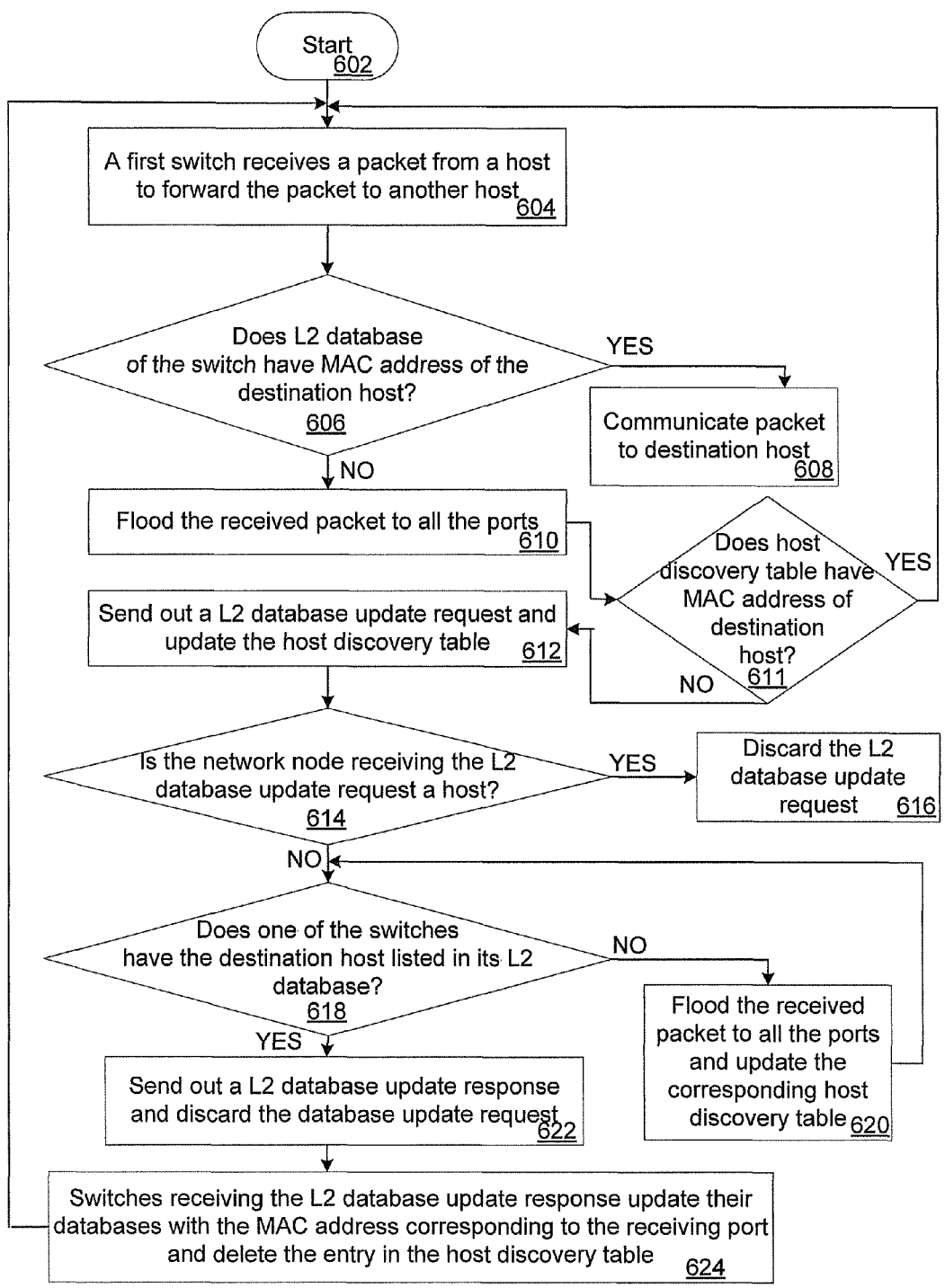
FIG. 6 is an exemplary flow chart illustrating exemplary steps for communicating a packet from one host to another by sharing the database among switches to avoid flooding in switches, in accordance with an embodiment of the invention.

FIG. 6 is an exemplary flow chart illustrating exemplary steps for communicating a packet from one host to another by sharing the database among switches to avoid flooding in switches, in accordance with an embodiment of the invention. Referring to FIG. 6, exemplary steps may begin at step 602.

In step 604, a first switch, for example, the switch S_01 may be operable to receive a packet from a source host, for example, the host H_01_01, for forwarding to a destination host, for example, the host H_03_01. In step 606, the first switch S_01 may determine whether it has the MAC address of the destination host H_03_01 in its L2 database, for example, database 324. In instances where the first switch S_01 has the MAC address of the destination host H_03_01 in its L2 database 324, control passes to step 608.

In step 608, the first switch S_01 may communicate the packet to the destination host H_03_01 based on the MAC address of the destination host H_03_01 in its L2 database 324. In accordance with another embodiment of the invention, the first switch S_01 may communicate the packet via port P_01_02 to another switch, for example, switch S_02. The switch S_02 may determine whether it has the MAC address of the destination host H_03_01 in its L2 database, for example, database 324. In instances where the switch S_02 has the MAC address of the destination host H_03_01 in its L2 database 324, the switch S_02 may communicate the packet to the destination host H_03_01 based on the MAC address of the destination host H_03_01 in its L2 database 324. In instances where the switch S_02 does not have the MAC address of the destination host H_03_01 in its L2 database 324, control passes to step 610.

In instances where the first switch S_01 does not have the MAC address of the destination host H_03_01 in its L2 database 324, control passes to step 610. In step 610, the first switch S_01 may be operable to flood or replicate and communicate the received packet to all its ports, for example, P_01_02, except the port on which the packet was received, for example, P_01_01. In step 611, the first switch S_01 may determine whether it has the MAC address of the destination host H_03_01 in its host discovery table, for example, the host discovery table 326. In instances where the first switch S_01 has the MAC address of the destination host H_03_01 in its host discovery table 326, control returns to step 604.

In instances where the first switch S_01 does not have the MAC address of the destination host H_03_01 in its host discovery table 326, control passes to step 612. In step 612, the first switch S_01 may be operable to communicate a database update request 440 as described with respect to FIG. 4C to all its ports, for example, P_01_02. The database update request 440 may comprise the received packet's destination address as the MAC address to be discovered. The first switch S_01 may be operable to update the host discovery table 326 with the destination address of the received packet to indicate that the first switch S_01 has already communicated a L2 database update request 440 for this destination address. The update to the host discovery table 326 may ensure that the database update requests 440 are not sent out frequently, which may flood the network 100.

In step 614, it may be determined whether one or more of the network nodes, for example, the plurality of switches S_01, S_02, ..., S_10, for example, and/or the plurality of corresponding hosts H_01_02 ... H_01_N ... H_01_M, H_01_02 ... H_01_N ... H_01_M, for example, that are receiving the database update requests 440 are one or more of the plurality of hosts H_01_02 ... H_01_N ... H_01_M, H_01_02 ... H_01_N ... H_01_M, for example. In instances where one or more of the network nodes that are receiving the database update requests 440 are one or more of the plurality of hosts H_01_02 ... H_01_N ... H_01_M, H_01_02 ... H_01_N ... H_01_M, for example, control passes to step 616, where the received database update requests 440 may be discarded. For example, in step 616, one or more of the plurality of hosts H_01_02 H_01_N ... H_01_M, H_01_02 ... H_01_N ... H_01_M, for example, that receive the database update requests 440 from one or more of the plurality of switches S_01, S_02, ..., S_10, for example, may be operable to discard the received database update requests 440.

In instances where one or more of the network nodes that are receiving the database update requests 440 are not one or more of the plurality of hosts H_01_02 ... H_01_N ... H_01_M, H_01_02 ... H_01_N ... H_01_M, for example, control passes to step 618. In step 618, each of the plurality of switches S_01, S_02 ..., S_10, for example, may determine whether they have the MAC address of the destination host H_03_01 listed in their corresponding L2 databases 324. In instances where one or more of the plurality of switches S_01, S_02, ..., S_10, for example, do not have the MAC address of the destination host H_03_01 listed in their corresponding L2 databases 324, control passes to step 620. In step 620, one or more of the plurality of switches S_01, S_02, ..., S_10, for example, may be operable to flood or replicate and communicate the received packet to all its ports, for example, P_02_02, except the port on which the packet was received, for example, P_02_01. One or more of the plurality of switches S_01, S_02, ..., S_10, for example, may be operable to update their host discovery tables 326 with the destination address of the received packet to indicate that one or more of the plurality of switches S_01, S_02 ..., for example, has already communicated a L2 database update request 440 for this destination address. Control then returns to step 618.

In instances where one or more of the plurality of switches S_01, S_02, S_10, for example, has the MAC address of the destination host H_03_01 listed in their corresponding L2 databases 324, control passes to step 622. In step 622, the particular switch, for example, switch S_03 may be operable to respond back to one or more of the plurality of switches S_01, S_02 ..., S_10, for example, with database update responses 460 as described with respect to FIG. 4D based on the reception of the database update requests 440. The switch S_03 may be operable to discard the received database update request 440.

In step 624, one or more of the plurality of switches S_01, S_02, ..., S_10, for example, that receive the database update response 460 may update their corresponding databases 324 with the MAC address corresponding to the port on which the database update response 460 was received. The corresponding entry in the host discovery tables 326 may be removed when one or more of the plurality of switches S_01, S_02, ..., S_10, for example, receives the database update response 460 in response to the database update request 440 for the particular destination address and/or may age out after a particular duration of time. One or more of the plurality of hosts H_01_02 ... H_01_N ... H_01_M, H_01_02 ... H_01_N ... H_01_M, for example, that may receive the database update response 460 may discard it. In accordance with an exemplary embodiment, a multicast address MC_DA_1 may be utilized instead of utilizing a unicast MAC address S_MAC_1. For example, in instances where the intermediate switches may not be able to process the response packets having unicast destination addresses that may not belong to the intermediate switches, a multicast address may be utilized instead of utilizing a unicast MAC address. Control then returns to step 604. Notwithstanding, the present invention may not be so limited and one or more of the switches S_01, S_02, ..., S_10 may be operable to receive another packet to be forwarded to another host without waiting for the first received packet at the first switch S_01 to reach its destination, without limiting the scope of the invention.

In accordance with an embodiment of the invention, a method and system for avoiding flooding of packets in network switches may comprise a network 100 (FIG. 2). The network 100 may comprise a plurality of switches S_01, S_02, ..., S_10 (FIG. 2), for example, that may be interconnected to one or more hosts, H_01_02 ... H_01_N ... H_01_M, H_01_02 ... H_01_N ... H_01_M (FIG. 2), for example. One or more processors and/or circuits, for example, processor 320 (FIG. 3) for use in one of the plurality of switches, S_01, S_02, ..., S_10 (FIG. 1), for example, may be operable to communicate a discovery request 400 (FIG. 4A) to the one or more hosts H_01_02 ... H_01_N ... H_01_M, H_01_02 ... H_01_N ... H_01_M, for example. The processor 320 may be operable to receive a discovery response 420 (FIG. 4B) from the one or more hosts H_01_02 ... H_01_N ... H_01_M, H_01_02 ... H_01_N ... H_01_M, for example in response to the communicated discovery request 400. The processor 320 may be operable to update a database 324 (FIG. 324) with a MAC address of the one or more hosts H_01_02 ... H_01_N ... H_01_M, H_01_02 ... H_01_N ... H_01_M, for example, based on the received discovery response 420.

The one or more processors and/or circuits, for example, the processor 324 in a first of the plurality of switches S_01 may be operable to receive, from the one or more hosts, for example, host H_01_01, a packet to be communicated to another of the one or more hosts, for example, host H_03_01. The one or more processors and/or circuits, for example, the processor 320 may be operable to determine whether the MAC address of the another of one or more hosts, for example, host H_03_01 is listed in the database 324. In instances where the MAC address of the another of the one or more hosts, for example, host H_03_01 is not listed in the database 324, the one or more processors and/or circuits, for example, the processor 320 may be operable to replicate the received packet to remaining ones of the plurality of switches, S_02, ..., S_10, for example, other than the first of the plurality of switches, for example, switch S_01. The one or more processors and/or circuits, for example, the processor 320 may be operable to communicate a database update request 440 (FIG. 4C) from the first of plurality of switches S_01 to the remaining ones of the plurality of switches S_02, ..., S_10, for example, to determine the MAC address of the another of the one or more hosts, for example, the host H_03_01. The one or more processors and/or circuits, for example, the processor 320 may be operable to update a host discovery table 326 (FIG. 3) based on the communicated database update request 440.

The one or more processors and/or circuits, for example, processor 320 may be operable to determine whether the another of the one or more hosts, for example, the host H_03_01 is directly connected to any of the remaining ones of the plurality of switches S_02, ..., S_10, for example, based on the communicated database update request 440. The one or more processors and/or circuits, for example, the processor 320 may be operable to receive a database update response 460 (FIG. 4D) from any of the remaining ones of the plurality of switches, for example, the switch S_03 that is directly connected to the another of the one or more hosts, for example, the host H_03_01. The one or more processors and/or circuits, for example, the processor 320 may be operable to update the database 324 with the MAC address corresponding to a port, for example, P_02_02 and P_01_02 on which the database update response 460 is received. The one or more processors and/or circuits, for example, the processor 320 may be operable to delete an entry in the host discovery table 326 based on the received database update response 460. After the database 324 has been updated in the one or more switches S_02, ..., S_10, for example, the packets to be forwarded from the host H_01_01 to the host H_03_01 may follow a single path, for example, from the host H_01_01 to the switch S_01 to the switch S_02 to the switch S_03 to the host H_03_01, and accordingly avoid flooding of packets in the network 100.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising a network that comprises a plurality of switches interconnected to one or more hosts. A discovery request may be communicated from one of the plurality of switches to the one or more hosts. A discovery response may be received from the one or more hosts in response to the communicated discovery request. A database may be updated with a MAC address of the one or more hosts based on the received discovery response.

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
communicating a discovery request from one of a plurality of switches to one or more hosts, the hosts and the switches being interconnected via a network;
receiving a discovery response from the one or more hosts in response to the communicated discovery request; and
updating a database with a Media Access Control (MAC) address of the one or more hosts based at least in part on said received discovery response.

2. The method according to claim 1, comprising receiving at a first of said plurality of switches, from said one or more hosts, a packet to be communicated to another of said one or more hosts.

3. The method according to claim 2, comprising determining whether said MAC address of said another of said one or more hosts is listed in said database.

4. The method according to claim 3, comprising replicating said received packet to remaining ones of said plurality of switches other than said first of said plurality of switches, if said MAC address of said another of said one or more hosts is not listed in said database.

5. The method according to claim 4, comprising communicating a database update request from said first of said plurality of switches to said remaining ones of said plurality of switches to determine said MAC address of said another of said one or more hosts.

6. The method according to claim 5, comprising updating a host discovery table based on said communicated database update request.

7. The method according to claim 6, wherein said remaining ones of said plurality of switches determine whether said another of said one or more hosts is directly connected to any of said remaining ones of said plurality of switches based on said communicated database update request.

8. The method according to claim 7, comprising receiving a database update response from said any of said remaining ones of said plurality of switches that is directly connected to said another of said one or more hosts.

9. The method according to claim 8, comprising updating said database with said MAC address corresponding to a port on which said database update response is received.

10. The method according to claim 9, comprising deleting an entry in said host discovery table based on said received database update response.

11. A system for communication, the system comprising:
a plurality of switches interconnected to one or more hosts via a network, at least one of the switches comprising one or more processors, one or more circuits, or any combination thereof configured to:
communicate a discovery request to the one or more hosts;
receive a discovery response from the one or more hosts in response to the communicated discovery request; and
update a database with a Media Access Control (MAC) address of said one or more hosts based on said received discovery response.

12. The system according to claim 11, wherein said one or more processors and/or circuits in a first of said plurality of switches are operable to receive, from said one or more hosts, a packet to be communicated to another of said one or more hosts.

13. The system according to claim 12, wherein said one or more processors and/or circuits are operable to determine whether said MAC address of said another of said one or more hosts is listed in said database.

14. The system according to claim 13, wherein said one or more processors and/or circuits are operable to replicate said received packet to remaining ones of said plurality of switches other than said first of said plurality of switches, if said MAC address of said another of said one or more hosts is not listed in said database.

15. The system according to claim 14, wherein said one or more processors and/or circuits are operable to communicate a database update request from said first of said plurality of switches to said remaining ones of said plurality of switches to determine said MAC address of said another of said one or more hosts.

16. The system according to claim 15, wherein said one or more processors and/or circuits are operable to update a host discovery table based on said communicated database update request.

17. The system according to claim 16, wherein said one or more processors and/or circuits are operable to determine whether said another of said one or more hosts is directly connected to any of said remaining ones of said plurality of switches based on said communicated database update request.

18. The system according to claim 17, wherein said one or more processors and/or circuits are operable to receive a database update response from said any of said remaining ones of said plurality of switches that is directly connected to said another of said one or more hosts.

19. The system according to claim 18, wherein said one or more processors and/or circuits are operable to update said database with said MAC address corresponding to a port on which said database update response is received.

20. The system according to claim 19, wherein said one or more processors and/or circuits are operable to delete an entry in said host discovery table based on said received database update response.

21. A non-transitory computer-readable medium embodying a program executable in a computing device which results in the computing device performing:
   communicating a discovery request from one of a plurality of switches to one or more hosts;
   receiving a discovery response from the one or more hosts in response to the communicated discovery request; and
   updating a database with a MAC address of the one or more hosts based at least in part on the received discovery response.

* * * * *